(12) United States Patent
Kim et al.

(10) Patent No.: US 12,384,104 B2
(45) Date of Patent: Aug. 12, 2025

(54) 3D OVER-PRINTING DEVICE AND METHOD

(71) Applicant: QUVE CO. LTD., Seoul (KR)

(72) Inventors: Jin Soo Kim, Yongin-si (KR); Tae Min Kang, Suwon-si (KR)

(73) Assignee: QUVE CO. LTD., Seoul (KR)

( * ) Notice: Subject to any disclaimer, the term of this patent is extended or adjusted under 35 U.S.C. 154(b) by 217 days.

(21) Appl. No.: 18/258,915

(22) PCT Filed: Dec. 14, 2021

(86) PCT No.: PCT/KR2021/019003
§ 371 (c)(1),
(2) Date: Jun. 22, 2023

(87) PCT Pub. No.: WO2022/145815
PCT Pub. Date: Jul. 7, 2022

(65) Prior Publication Data
US 2024/0042681 A1    Feb. 8, 2024

(30) Foreign Application Priority Data

Dec. 30, 2020 (KR) ........................ 10-2020-0187784

(51) Int. Cl.
| | | |
|---|---|---|
| *B29C 41/20* | (2006.01) | |
| *B29C 41/46* | (2006.01) | |
| *B29C 41/52* | (2006.01) | |
| *B29C 64/124* | (2017.01) | |
| *B29C 64/129* | (2017.01) | |
| *B29C 64/264* | (2017.01) | |

(Continued)

(52) U.S. Cl.
CPC .......... *B29C 64/129* (2017.08); *B29C 64/264* (2017.08); *B29C 64/295* (2017.08); *B29C 64/386* (2017.08); *B33Y 10/00* (2014.12); *B33Y 30/00* (2014.12); *B33Y 50/00* (2014.12)

(58) Field of Classification Search
CPC ......... B29C 41/20; B29C 41/46; B29C 41/52; B29C 64/124; B29C 64/129; B29C 64/277; B29C 64/282; B29C 64/295; B29C 64/386; B29C 70/68; B29C 70/70; B33Y 10/00; B33Y 30/00; B33Y 50/00; G01F 23/00
USPC .................. 264/40.1, 40.4, 279, 279.1, 401; 425/110, 135, 174.4; 73/290 R
See application file for complete search history.

(56) References Cited

FOREIGN PATENT DOCUMENTS

| | | |
|---|---|---|
| JP | 2003-181942 A | 7/2003 |
| KR | 10-1406900 B1 | 6/2014 |

(Continued)

OTHER PUBLICATIONS

International Search Report PCT/ISA/210 for International Application No. PCT/KR2021/019003 on Mar. 18, 2022.

*Primary Examiner* — Leo B Tentoni
(74) *Attorney, Agent, or Firm* — Harness, Dickey & Pierce, P.L.C.

(57) ABSTRACT

Proposed is a 3D over-printing device for over-printing a 3D shape on an existing structure, the device including: a vat containing a light-curable material; a driving part configured to fix the existing structure and move the existing structure vertically, layer by layer, within the vat; and an optical part comprising a projector and a mirror structure, and configured to photocure an area to be cured on a surface of the light-curable material by projecting UV light in several directions simultaneously from above the surface of the light-curable material toward the surface of the light-curable material that is upward exposed and in contact with the existing structure.

16 Claims, 12 Drawing Sheets

< Examples of preventing occurrence of non-curable areas due to shadows >

(51) Int. Cl.
*B29C 64/277* (2017.01)
*B29C 64/282* (2017.01)
*B29C 64/295* (2017.01)
*B29C 64/386* (2017.01)
*B29C 70/68* (2006.01)
*B29C 70/70* (2006.01)
*B33Y 10/00* (2015.01)
*B33Y 30/00* (2015.01)
*B33Y 50/00* (2015.01)
*G01F 23/00* (2022.01)

(56) References Cited

FOREIGN PATENT DOCUMENTS

| | | |
|---|---|---|
| KR | 10-1533374 B1 | 7/2015 |
| KR | 10-2016-0144838 A | 12/2016 |
| KR | 10-2106102 B1 | 5/2020 |

FIGURE 3
Rotation of projector
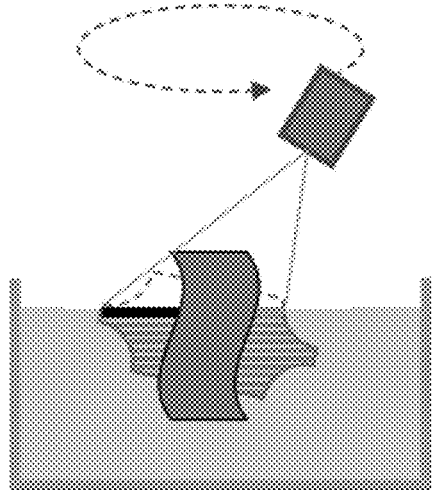
Several projectors
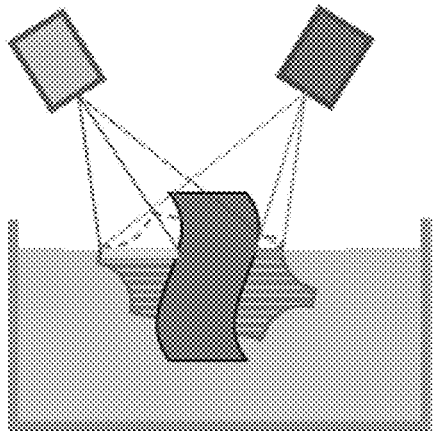
< Examples of preventing occurrence of
non-curable areas due to shadows >

< Conceptual diagram of image split areas and projection directions >

3D OVER-PRINTING DEVICE AND METHOD

CROSS-REFERENCE TO RELATED APPLICATIONS

This application is a national phase under 35 U.S.C. § 371 of PCT International Application No. PCT/KR2021/019003 which has an International filing date of Dec. 14, 2021, which claims priority to KR Application No. 10-2020-0187784, filed Dec. 30, 2020, the entire contents of each of which are hereby incorporated by reference.

TECHNICAL FIELD

The present disclosure relates to a 3D over-printing device and method for over-printing a 3D shape on an existing structure. More particularly, the present disclosure relates to a 3D over-printing device and method for photocuring using mirrors to simultaneously project split images in several directions onto a surface of an UV-curable material.

BACKGROUND ART

There are proposed 3D over-printing devices and methods for printing a new shape on an existing structure by using a polymer material or a material to which the polymer material is added.

Among the devices and methods, the present applicant filed Patent 1 (Korean Patent No. 10-2106102) in the related art, which discloses a 3D over-printing device and method wherein outside a vat containing a light-curable material, one projector is rotated to project UV light images successively in several directions or a plurality of projectors are used to project UV light images simultaneously in several directions onto an existing structure immersed in the light-curable material, and light energy increases in an UV light overlap area in the light-curable material, thus inducing light curing.

However, this method has limitations in application in cases where light-curable materials, such as resin, are opaque or have high absorbance so the UV light cannot penetrate into the resin in which an existing structure is immersed.

To solve this problem, for opaque resin, an area cured with UV light is the surface of the resin, so the existing SLA and vat photopolymerization methods, which cause the resin surface to be photocured, may be considered. The vat photopolymerization methods includes the bottom-up method, which UV images are projected onto a transparent window at the bottom of a resin vat, and the top-down method, which UV images are projected onto a resin surface from above a vat, as schematically shown in FIG. 1. Both of the two methods are appropriate to directly form a new structure without an existing structure.

This is because there are problems as follows. In the case of the bottom-up method, at the beginning, there is no gap between a support surface and the bottom of a resin vat. Next, the support surface is raised layer by layer and the part of resin that comes into contact with the bottom of the resin vat is photocured. Therefore, when there is an existing structure, it is impossible to print because the two surfaces cannot be in close contact or the gap therebetween cannot be adjusted. In the case of the top-down method, as schematically shown in FIG. 2, photocuring takes place at the top surface of resin. Therefore, when there is an existing structure, shadow areas occur depending on the shape of the structure or the direction of emitting UV light, making it impossible to print properly.

Therefore, there is still a need for revolutionary research on a device and a method for easily over-printing and manufacturing a shape on an existing structure, wherein the shape and the existing structure are made of the same or different types of materials.

DISCLOSURE

Technical Problem

Accordingly, the present disclosure has been made keeping in mind the above problems occurring in the related art, and the present disclosure is directed to providing a 3D over-printing device and method, wherein an optical part is configured such that partial areas of UV light projected from one projector have respective projection directions reversed with a plurality of mirrors and are simultaneously projected onto an existing structure in several directions, thereby solving the problem of occurrence of shadow areas depending on the shape of the existing structure or the projection directions.

In addition, the present disclosure is directed to providing a 3D over-printing device and method, wherein a surface area of a light-curable material contained in a vat is successively photocured, thereby over-printing a 3D shape on an existing structure even with the light-curable material that is opaque or has high light absorbance.

It is to be understood that technical problems to be solved by the present disclosure are not limited to the aforementioned technical problems and other technical problems which are not mentioned will be apparent from the following description to a person with an ordinary skill in the art to which the present disclosure pertains.

Technical Solution

According to an embodiment of the present disclosure, there is provided a 3D over-printing device for over-printing a 3D shape on an existing structure, the device including: a vat containing a light-curable material; a driving part configured to fix the existing structure and move the existing structure vertically, layer by layer, within the vat; and an optical part including a projector and a mirror structure, and configured to photocure an area to be cured on a surface of the light-curable material by projecting UV light in several directions simultaneously from above the surface of the light-curable material toward the surface of the light-curable material that is upward exposed and in contact with the existing structure, wherein the optical part operates such that an image of a shape to be cured on the surface of the light-curable material contained in the vat is divided into several areas according to projection directions and when the several areas are converted and simultaneously projected with the projector, split images are reflected from the mirror structure and projected in several directions and a combined image becomes the shape to be cured.

In the embodiment, preferably, the optical part includes: the one projector; and the mirror structure including two or more mirrors perpendicular or parallel to each other.

In addition, in the embodiment, preferably, the optical part includes: a plurality of the projectors that are two in number; and the mirror structure including two or more mirrors perpendicular or parallel to each other.

In addition, in the embodiment, preferably, the optical part includes: the one projector; and the mirror structure including four mirrors.

In addition, in the embodiment, preferably, the optical part includes: a plurality of the projectors that are two in number; and the mirror structure including four mirrors.

In addition, in the embodiment, preferably, the 3D over-printing device further includes a heating means for heating a surface area of the light-curable material contained in the vat to lower viscosity.

In addition, in the embodiment, preferably, the driving part is configured to drive the existing structure to be capable of moving up and down and tilting left and right.

In addition, in the embodiment, preferably, the 3D over-printing device further includes a level sensor for automatically regulating a level of the light-curable material contained in the vat.

In the meantime, according to an embodiment of the present disclosure, there is provided a 3D over-printing method for over-printing a 3D shape on an existing structure by using a 3D over-printing device as described above, the method including: positioning the existing structure, which requires over-printing, within a vat containing a light-curable material; and performing deposition steps for over-printing on the existing structure in a top-down manner, layers of the light-curable material that are upward exposed while the existing structure is lowered layer by layer within the vat are successively photocured, wherein in the deposition steps, while the existing structure is lowered layer by layer, light-curing steps are performed successively, wherein in each of the light-curing steps, an image of a shape to be cured on a surface of the light-curable material contained in the vat is divided into several areas according to projection directions and when the several areas are converted and projected with a projector, split images are reflected from a mirror structure and projected in several directions and a combined image becomes the shape to be cured.

in the embodiment, preferably, each of the deposition steps includes: creating a slice image of an area to be over-printed on the existing structure; dividing direction in which projection takes place into several directions to determine image areas for the respective directions, and dividing the slice image into images corresponding to respective split areas; converting split images and combining the same into one projection image, considering image inversion and image distortion by mirrors; loading the combined projection image to the projector for projection; and creating a shape to be cured, by projecting the split images reflected from respective mirror surfaces onto respective split surfaces of an over-printing area.

In addition, in the embodiment, preferably, each of the deposition steps includes: with the one projector and the mirror structure that includes two or more mirrors perpendicular or parallel to each other, dividing an image according to directions in which light projected by the projector is reflected from mirror surfaces and projected onto a surface of the light-curable material.

In addition, in the embodiment, preferably, each of the deposition steps includes: with a plurality of the projectors that are two in number and the mirror structure that includes two or more mirrors perpendicular or parallel to each other, dividing an image according to directions in which light projected by the projectors is reflected from mirror surfaces and projected onto a surface of the light-curable material.

In addition, in the embodiment, preferably, each of the deposition steps includes: dividing direction in which projection with the one projector and the mirror structure including four mirrors takes place into eight directions.

In addition, in the embodiment, preferably, each of the deposition steps includes: dividing direction in which projection with a plurality of the projectors that are two in number and the mirror structure including four mirrors takes place into 10 directions.

In addition, in the embodiment, preferably, each of the deposition steps further includes: heating a surface area of the light-curable material so that viscosity of the light-curable material is lowered when a new layer to be cured is created by lowering the existing structure layer by layer.

In addition, in the embodiment, preferably, each of the deposition steps further includes: driving the existing structure in a mixed manner that raises, lowers, and tilts the existing structure in left and right directions, when a new layer to be cured is created by lowering the existing structure layer by layer.

Advantageous Effects

By using the 3D over-printing device for over-printing a 3D shape on an existing structure according to the present disclosure with the above configuration, the 3D shape can be easily over-printed on the existing structure while the problem of the occurrence of shadow areas depending on a complex shape of the existing structure or projection direction is prevented in advance.

In addition, according to the present disclosure, a surface area of the light-curable material contained in the vat is successively photocured, thereby over-printing the 3D shape on the existing structure even with the light-curable material that is opaque or has high light absorbance.

DESCRIPTION OF DRAWINGS

FIG. 3 is a diagram schematically illustrating examples of solving the problem of occurrence of shadow areas.

MODE FOR INVENTION

First, as a method to solve the problem of shadow areas occurring when the existing top-down method described above is used for over-printing, projection in several directions may be considered. For example, as schematically shown in FIG. 3, one projector is rotated around an existing structure to project images that correspond to shapes to be cured in respective directions from all the directions, or several projectors are installed in several directions to simultaneously project images that correspond to shapes to be cured in the respective directions from the several directions.

However, the method of rotating one projector requires a driving mechanism that makes 360-degree rotation of an optical system or a vat containing an existing structure and light-curable resin. Therefore, the device configuration is complex and the time that it takes to photocure one layer of the surface is long as much as the rotation time. In addition, the method of installing several projectors has a limitation in the number of projectors that can be installed because of the size of a projector. Therefore, the number of directions in which simultaneous projection is performed is limited. As the number of installed projectors increases, the size of the entire system, the complexity of the configuration, and costs increase. Therefore, there is a need to develop a system that emits light in several directions simultaneously at a low cost, making 360-degree rotation unnecessary, reducing the printing time, and avoiding excessive size or complexity of the system.

Figure 1:
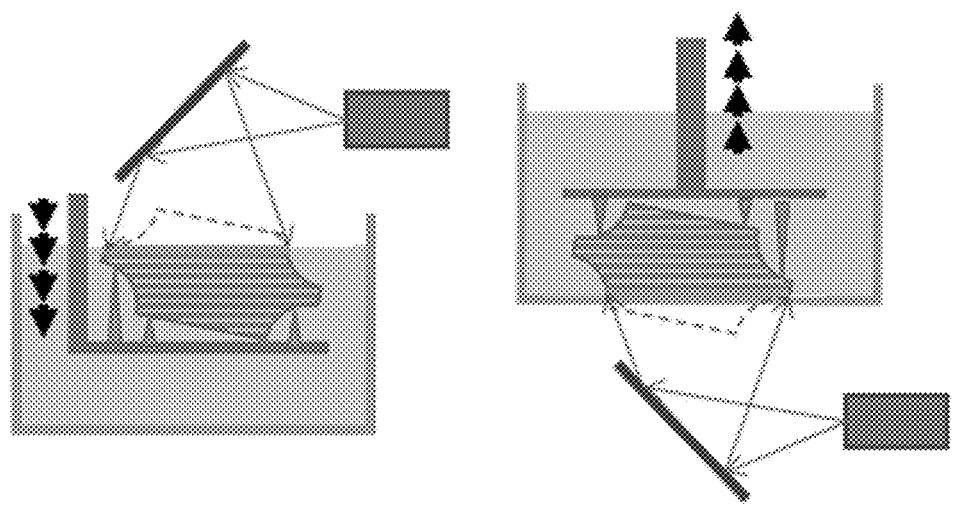
FIG. 1 is a diagram schematically illustrating operating principles of the top-down method and the bottom-up method.
Figure 2:
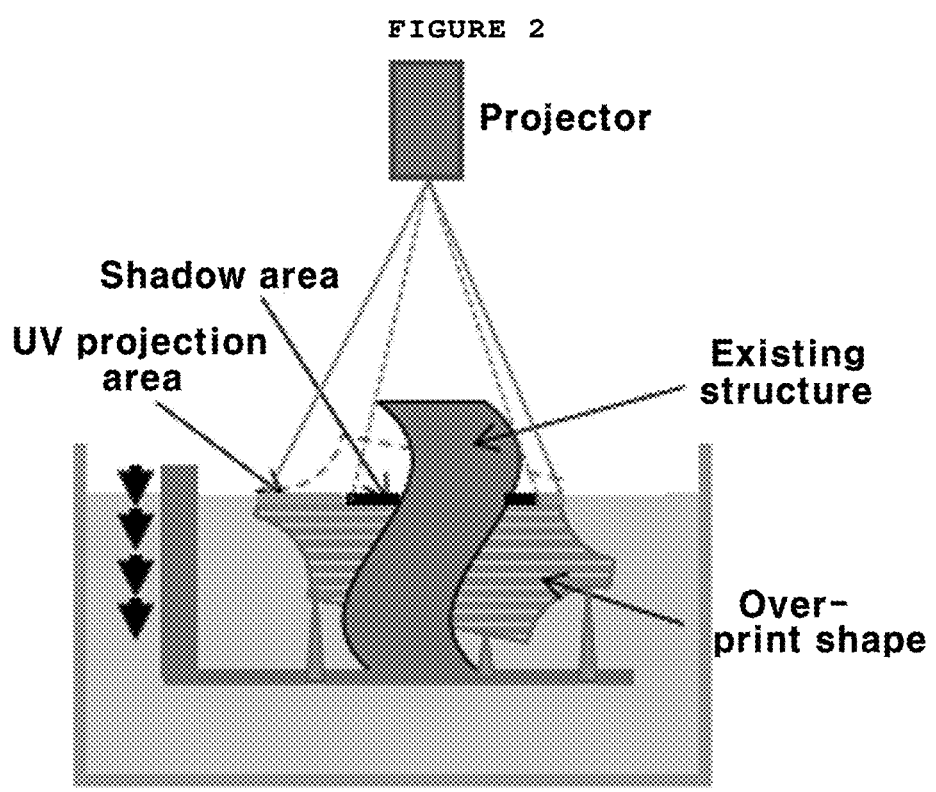
FIG. 2 is a diagram schematically illustrating the problem of occurrence of shadow areas when over-printing of the top-down method is performed.
Figure 4:
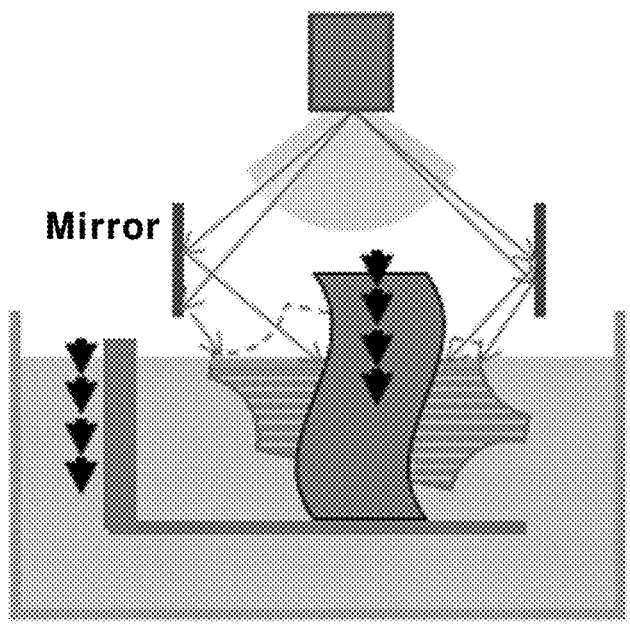
FIG. 4 is a diagram schematically illustrating an over-printing method, which is applicable to the present disclosure, using mirrors to project images segmentally.

Considering this situation, the inventors have devised a method of realizing projection in several directions using a plurality of mirrors to solve the problem of shadow areas. For example, as schematically shown in FIG. 4, one projector and two or more mirrors are arranged so that the mirrors are used to reverse projection directions of respective partial areas of UV light projected from the projector and the partial areas of UV light are simultaneously projected onto an existing structure in several directions.

Figure 5:
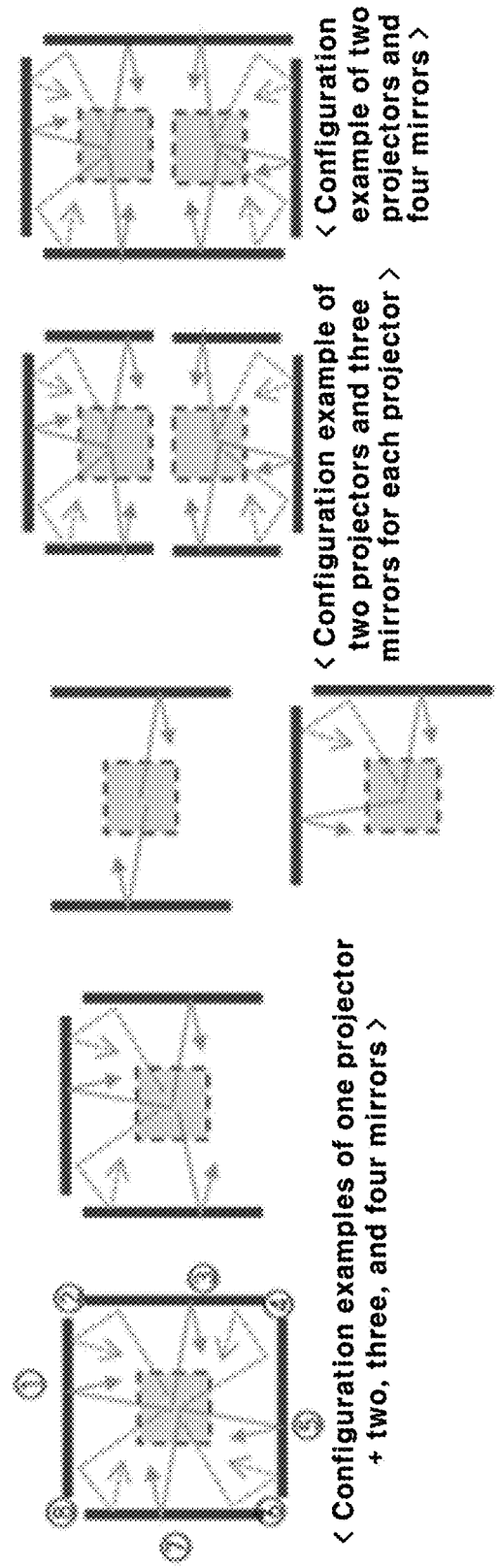
FIG. 5 is a diagram illustrating examples of the arrangement of a projector and a mirror in combination.

A method of combination of a projector and a mirror may be, as shown in FIG. 5 as an example, using one projector and two, three, or four mirrors perpendicular or parallel to each other, or using two projectors and two or more mirrors perpendicular or parallel to each other, or using three mirrors for each projector, or using two projectors and four mirrors.

Figure 6:
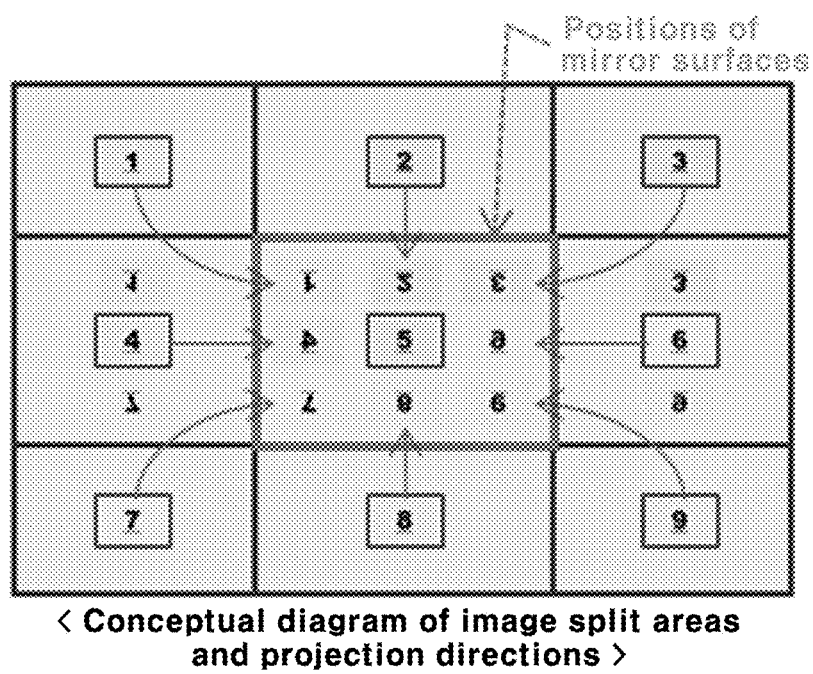
FIG. 6 is a conceptual diagram illustrating image split areas and projection directions.

Among these, the case of using one projector and four mirrors will be described as an example. An area may be divided into a total of eight directions: four directions in which reflection from the four mirror surfaces and direct projection onto the resin surface take place; and four directions of the corner parts in which reflection twice continuously from adjacent mirror surfaces and projection onto the resin surface take place. In this case, the conceptual diagram of image split areas and projection directions is shown in FIG. 6.

In addition, in the case of using two projectors and four mirrors, an area may be divided into a total of 10 directions, five directions for each projector: three directions in which reflection from three mirror surfaces close to each projector and direct projection onto the resin surface take place; and two directions of the corner parts in which reflection twice continuously from adjacent mirror surfaces and projection onto the resin surface take place.

When the offset of a projector is close to 0, incident angles are large in the upward, downward, left, and right directions of a projection image. When mirrors are placed on four sides for reflection, projection light with large incident angles from eight directions toward the center of an image may be obtained. The eight directions are four directions of the respective mirrors and four directions of the corners at which the mirrors meet orthogonally.

However, when a projector with a large offset of about 100% is used to obtain a larger incident angle, large incident angles are obtained in three, left, right, and upward, directions of a projection image, but an incident angle is small, close to 0, in the downward direction. Therefore, when one projector is provided with mirrors on three (left/right/up) sides, a projection beam with large incident angles from five directions toward the center may be obtained. The five directions are three directions of the mirror surfaces and two directions of the corners between the mirrors. Such a combination of one projector and mirrors on three sides is an asymmetrical structure with no projection light from the downward direction. By symmetrically placing another identical combination of one projector and mirrors on three sides, projection light incident symmetrically from a total of 10 directions, specifically, five directions from each of the two projectors, may be obtained.

An image of a shape to be cured on the light-curable resin surface is divided into several areas according to projection directions, and when the several areas are converted and projected with a projector, split images are reflected from the respective mirrors and projected onto the resin surface in several directions and the combined image becomes the shape to be cured.

Hereinafter, a 3D over-printing device according to an embodiment of the present disclosure for realizing the above-described principles will be described in detail.

Figure 7:
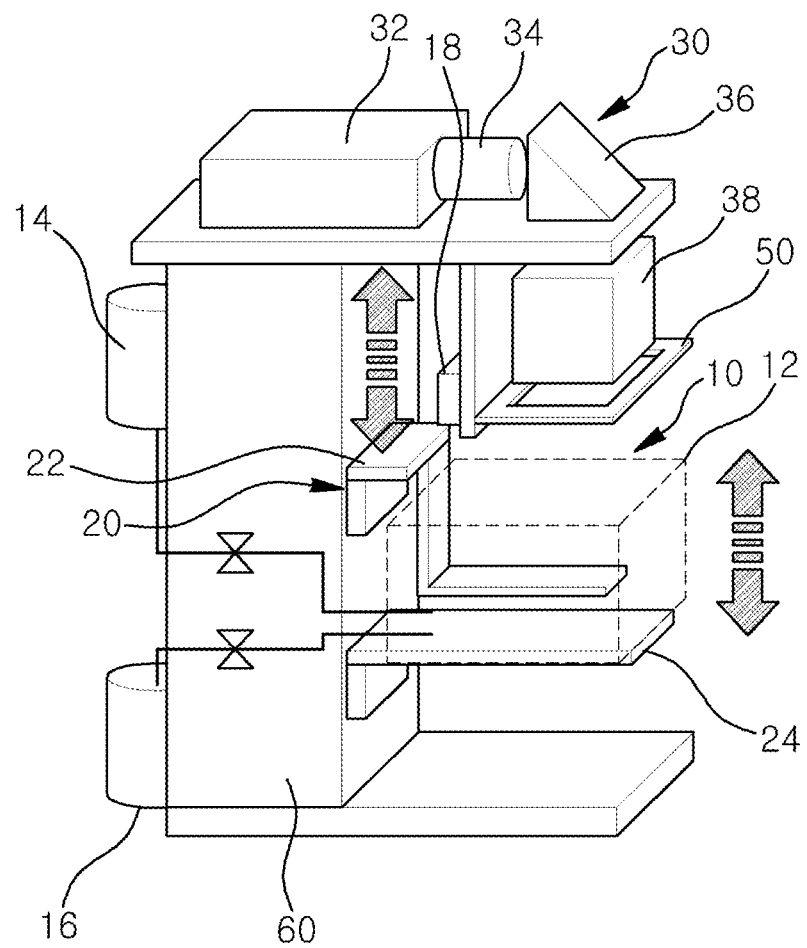
FIG. 7 is a perspective view schematically illustrating a 3D over-printing device according to an embodiment of the present disclosure.

A 3D over-printing device according to an embodiment of the present disclosure, as schematically shown in FIG. 7, includes a vat part 10, a driving part 20, and an optical part 30. The vat 10 contains a light-curable material to selectively cure the light-curable polymer material on an existing structure with UV light radiation. The driving part 20 fixes the existing structure and moves the existing structure vertically, layer by layer, within the vat. The optical part 30 includes a projector and a mirror structure for projecting UV light in several directions simultaneously. Hereinafter, how the elements are installed and operate will be described.

First, to support the elements, a base plate at the bottom and a body frame 60 extending upwardly therefrom are provided. Inside and outside the body frame 60, the elements are fixed or movably installed.

The vat part 10 includes: a vat 12 with an open top in which light-curable resin is contained; and a resin supply tank 14 and a resin discharge tank 16 for storing resin supplied to or discharged from the vat 12. The resin supply tank 14 and the resin discharge tank 16 are respectively placed above and below the vat 12, and connected to the vat 12 through respective pipes each having an opening and closing valve for controlling the flow of resin.

In addition, preferably, a configuration for automatically regulating the level of resin in the vat 12. The configuration includes: a level sensor 18 installed at the upper part or on the side of the vat 12; and a controller for opening and closing the opening and closing valves appropriately according to a measurement signal from the level sensor 18.

The driving part 20 includes: a structure holder 22 including a structure support for supporting an existing structure and a printed object; and a driving mechanism for moving the structure holder 22 vertically, layer by layer. In addition, the driving part may further include a driving mechanism for moving a vat support 24, which supports the vat 12, vertically. The driving mechanisms may be placed within the body frame 60.

The optical part 30 is placed at the upper part of the vat 12, and includes: a projector 32 horizontally mounted at the top of the body frame 60; a fold mirror 36 for reflecting images projected by the projector 32 through a lens 34, vertically downward; and a mirror structure 38 placed below the fold mirror 36.

An image of a shape to be cured on the surface of the resin contained in the vat 12 is divided into several areas according to projection directions, and when the several areas are converted and projected with the projector 32, split images are respectively reflected from a plurality of mirrors of the mirror structure 38 and projected onto the resin surface in several directions and the combined image becomes the shape to be cured.

Herein, with reference to the exemplary realized examples shown in FIGS. 5 and 6, the projector 32 and the mirror structure 38 may be configured as a combination of one projector and a plurality of mirrors or a combination of a plurality of projectors and a plurality of mirrors and may be appropriately placed so as to efficiently solve the problem that areas not photocurable occur due to shadows caused by light irradiation directions and a shape of an existing structure.

The projector 32 is an element for providing a light source required for curing to the light-curable material contained in the vat 12, and may be digital light processing projector (DLP projector) or any other image-producing optical system. Any type of optical system may be used as long as it can create a 1D or 2D optical image or projection facing the light-curable material.

Figure 8:
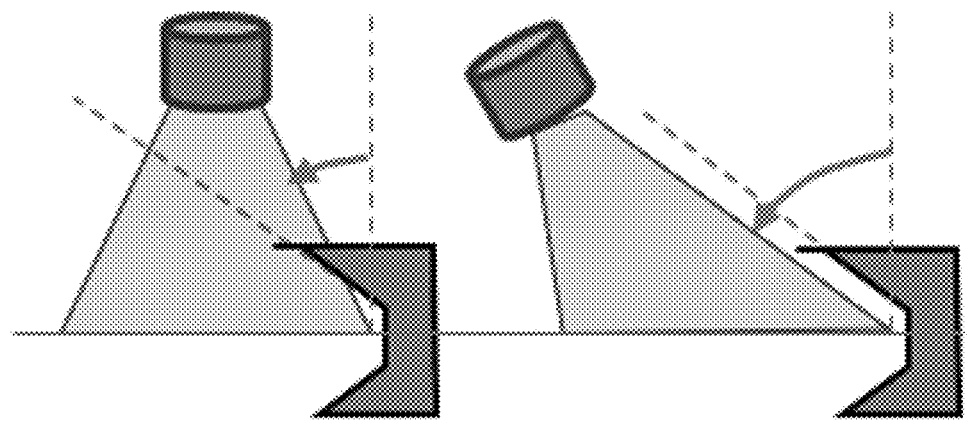
FIG. 8 is a diagram illustrating variations in the occurrence of shadow areas depending on the incident angle of UV light.

In the meantime, the incident angle of UV light provided by the projector enables over-printing without generating shadows over the inclined portion of the existing structure, so it is preferable that a projector has a small throw ratio (preferably 1.0 or less) (see FIG. 8).

Figure 9:
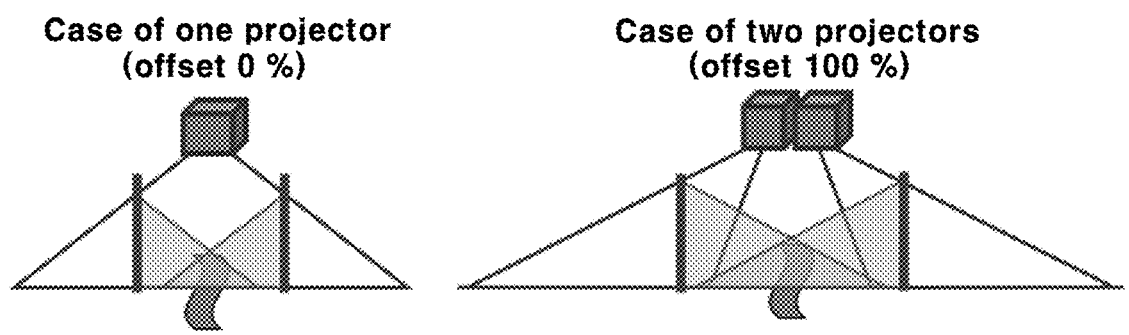
FIG. 9 is a diagram illustrating an example of the arrangement of a projector and a mirror depending on the offset of the projector.

In addition, as schematically shown in FIG. 9, when the offset of a projector is close to 0%, the projection directions are close to symmetrical, so it is preferable that one projector and several mirrors are configured. When the offset is large, such as 100% or greater, the incident angles are asymmetrical, that is, one end has a large incident angle while the other end has an incident angle close to 0 (vertical incidence), so it is preferable that a mirror is placed on the side with the larger incident angle of projection light of each projector and a plurality of such projectors are used to finally form a symmetrical projection light distribution.

Figure 10:
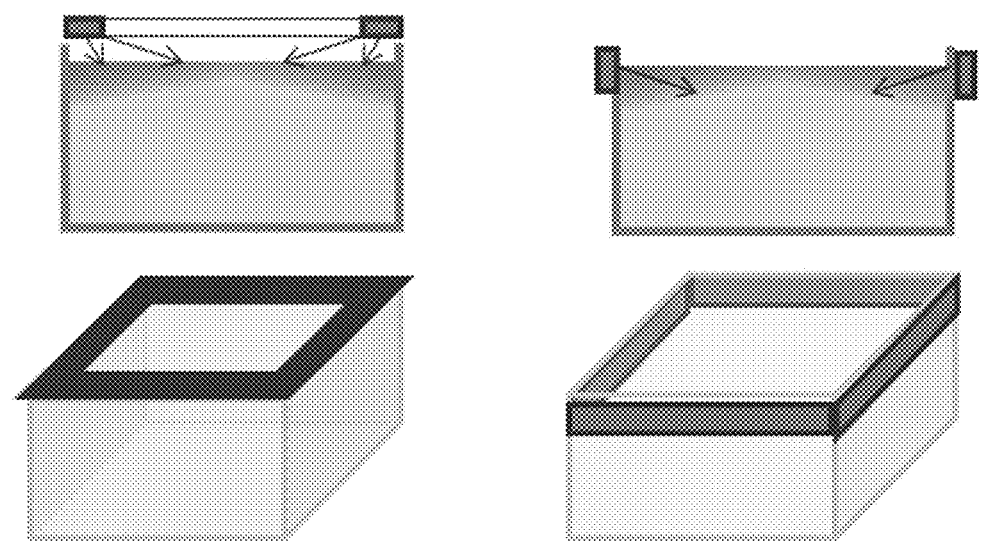
FIG. 10 is a diagram illustrating a method of attaching a heating mechanism to an upper part of a vat.

For layer-by-layer deposition using the top-down method, the structure holder 22 is lowered and a new resin layer covers a printed layer. If the viscosity of the resin is high, the resin does not flow easily, making it difficult and time-consuming for a new layer to form evenly. It is preferable to install a heating mechanism 50, which raises the surface temperature of the resin to reduce its viscosity so that the flow of the resin is smooth and a new layer is formed in a short time, at the upper part or the side of the vat 12 along the upper edge of the resin vat 12 (see FIG. 10).

Figure 11:
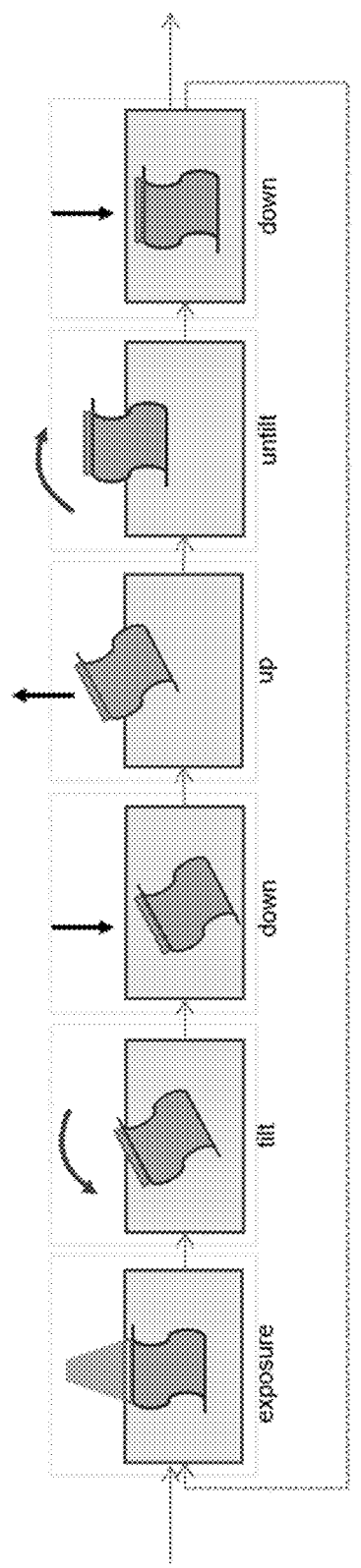
FIG. 11 is an example diagram illustrating the driving sequence of a printed-object support.

In addition, for utilization in conjunction with or independently of the heating mechanism 50 so that a new resin layer is easily formed, it is preferable that the structure support of the structure holder is configured to, when driven, be capable of vertical movement as well as tilting in the left and right directions. FIG. 11 illustrates the driving sequence of the structure support.

Hereinafter, an embodiment of an over-printing method, which uses the 3D over-printing device for over-printing a 3D shape on an existing structure according to an embodiment of the present disclosure configured as above, will be described in detail.

According to an embodiment of the present disclosure, a 3D over-printing method includes: positioning an existing structure, which requires over-printing, within a vat containing a light-curable material; and performing deposition steps for over-printing on the existing structure in a top-down manner, layers of the light-curable material that are upward exposed while the existing structure is lowered layer by layer within the vat are successively photocured.

First, the existing structure, which requires over-printing, is positioned on the structure holder 22 that is movable in the vertical direction layer by layer within the vat 10 containing the light-curable resin.

The existing structure, which requires over-printing of the same or different type of material on at least a portion of the exterior surfaces of the existing structure, may be a structure of various shapes which is a combination of concave or convex shapes, and may be made of transparent or opaque materials such as metals.

The existing structure may be manufactured by various methods known so far, and it is preferable that the surface of the existing structure is roughened in advance to increase the adhesion to the material attached or coupled onto the existing structure through light curing. As a means to do so, various methods may be used, including chemical etching, sand blasting, and laser surface treatment.

The existing structure needs to be secured to be positioned in a stable manner on the structure support of the structure holder 22, and various types of fixing means may be appropriately used when necessary.

The light-curable resin may be transparent resin or opaque resin.

In the deposition steps, while the existing structure is lowered layer by layer, light-curing steps are performed successively. In each of the light-curing steps, an image of a shape to be cured on a surface of the light-curable material contained in the vat is divided into several areas according to projection directions and when the several areas are converted and projected with the projector, split images are reflected from a mirror structure and projected in several directions and a combined image becomes the shape to be cured.

Figure 12:
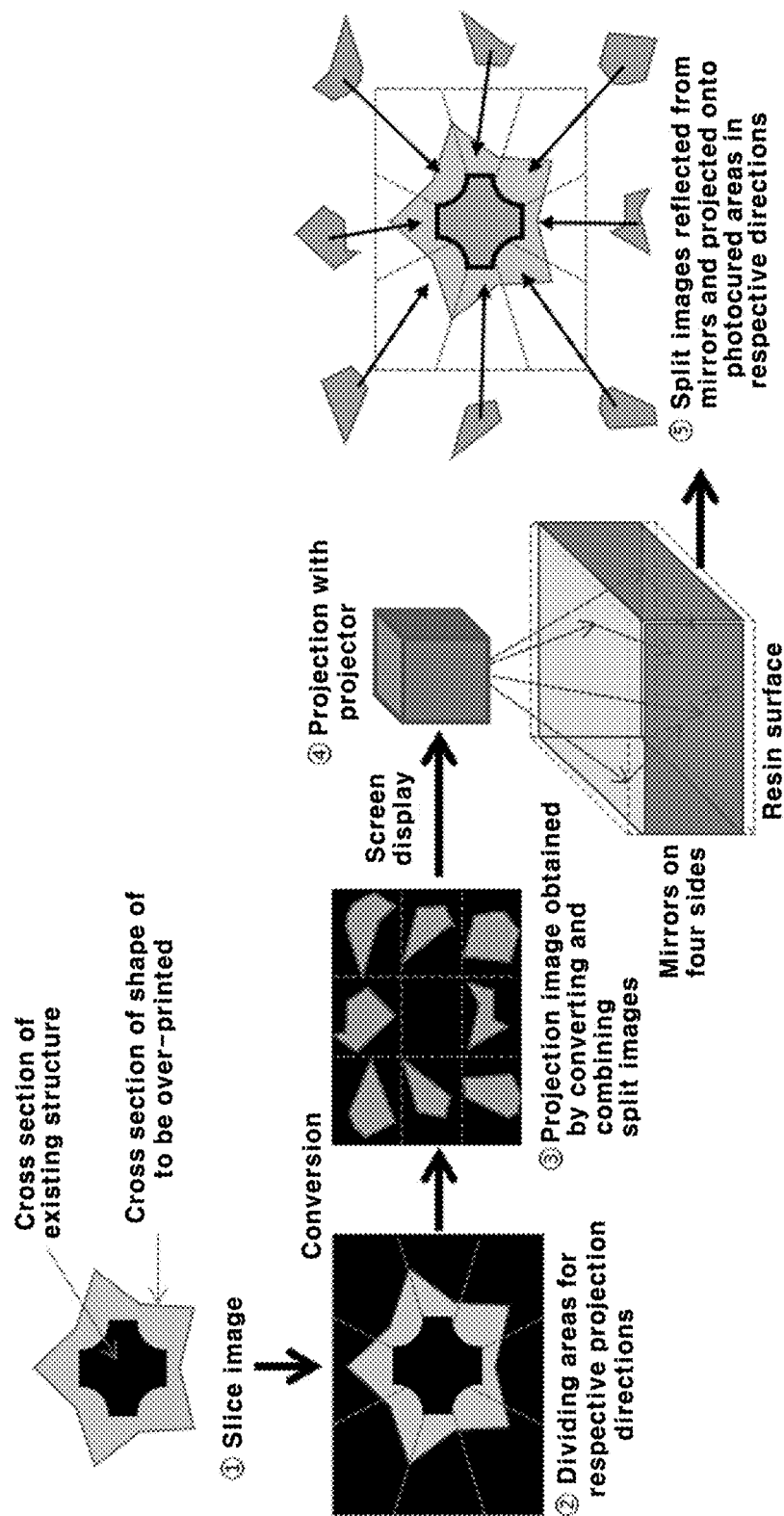
FIG. 12 is an example diagram illustrating an over-printing method according to an embodiment of the present disclosure.

This over-printing deposition step will be described in more detail with reference to the diagram shown in FIG. 12. FIG. 12 shows, as an example, the case of over-printing a 3D shape having a star-shaped cross-section, colored yellow, on an existing structure that has a cross-sectional shape protruding in four directions, up, down, left, and right.

First, ① in each deposition step, a slice image of an area to be over-printed on the existing structure is created using modeling and slicing programs. A variety of programs known so far may be used.

Next, ② the direction in which reflection from each mirror surface of the mirror structure and projection take place is divided into several directions, for example, two to 10 directions, and an image area for each direction is determined, and the slice image is divided into images corresponding to the respective split areas. FIG. 12 shows an example of division into eight directions.

Next, ③ considering image inversion and image distortion by mirrors, split images are converted and combined into one projection image. When two or more projectors are used, image split, conversion, and projection image combination steps take place for each projector.

Next, ④ the combined projection image is loaded to the corresponding projector and is projected. Then, ⑤ the split images reflected from the respective mirror surfaces are gathered in the direction (center) of the existing structure on the resin surface and projected onto respective split surfaces of an over-printing area, so that the whole shape is created.

To this end, among the arrangement states of a projector and a mirror structure including a plurality of mirrors shown in FIG. 5, an appropriate arrangement example is selected and used. When projection direction is divided into eight directions, it is preferable to configure an optical part including one projector and four mirrors. When projection direction is divided into 10 directions, it is preferable to configure an optical part including two projectors and four mirrors.

When deposition of one layer is completed as described above, the existing structure is lowered one layer within the vat and a new resin layer is formed on the printed layer, and the deposition step is repeated.

Herein, the deposition step may further include heating the surface area of the resin so as to lower the viscosity of the resin to induce the resin to flow rapidly and stably, when a new resin layer to be cured is created by lowering the existing structure layer by layer within the vat. In the heating step, it is preferable that heating is performed through a heating means that is placed at an upper part or outer part of an upper edge part of the vat.

In addition, the deposition step may further include driving the existing structure in a mixed manner that raises, lowers, and tilts the existing structure in the left and right directions within the resin, when a new resin layer to be cured is created by lowering the existing structure layer by layer within the vat. For example, the creation of a new resin layer is easily induced by continuously driving the existing structure to be tilted in the left direction, lowered, raised, tilted in the right direction, and lowered in that order as shown in FIG. 11. The driving step of the existing structure may be performed either simultaneously with the above-described heating step of the resin surface area, or independently.

The above-described deposition step is repeated until a final over-printing shape is completed. Afterward, the final object over-printed on the existing structure is taken out of the vat and a finishing process is performed.

The invention claimed is:

1. A 3D over-printing device for over-printing a 3D shape on an existing structure, the 3D over-printing device comprising:
   a vat containing a light-curable material;
   a driving part configured to fix the existing structure and move the existing structure vertically, layer by layer, within the vat; and
   an optical part comprising a projector and a mirror structure, and configured to photocure an area to be cured on a surface of the light-curable material by projecting UV light in several directions simultaneously from above the surface of the light-curable material toward the surface of the light-curable material that is upward exposed and in contact with the existing structure,
   wherein the optical part operates such that an image of a shape to be cured on the surface of the light-curable material contained in the vat is divided into several areas according to projection directions and when the several areas are converted and simultaneously projected with the projector, split images are reflected from the mirror structure and projected in several directions and a combined image becomes the shape to be cured.

2. The 3D over-printing device of claim 1, wherein the optical part comprises:
   the one projector; and
   the mirror structure comprising two or more mirrors perpendicular or parallel to each other.

3. The 3D over-printing device of claim 1, wherein the optical part comprises:
   a plurality of the projectors that are two in number; and
   the mirror structure comprising two or more mirrors perpendicular or parallel to each other.

4. The 3D over-printing device of claim 1, wherein the optical part comprises:
   the one projector; and
   the mirror structure comprising four mirrors.

5. The 3D over-printing device of claim 1, wherein the optical part comprises:
   a plurality of the projectors that are two in number; and
   the mirror structure comprising four mirrors.

6. The 3D over-printing device of claim 1, further comprising:
   a heating means for heating a surface area of the light-curable material contained in the vat to lower viscosity.

7. The 3D over-printing device of claim 1, wherein the driving part is configured to drive the existing structure to be capable of moving up and down and tilting left and right.

8. The 3D over-printing device of claim 1, further comprising:
   a level sensor for automatically regulating a level of the light-curable material contained in the vat.

9. A 3D over-printing method for over-printing a 3D shape on an existing structure by using a 3D over-printing device according to claim 1, the 3D over-printing method comprising:
   positioning the existing structure, which requires over-printing, within a vat containing a light-curable material; and
   performing deposition steps for over-printing on the existing structure in a top-down manner, layers of the light-curable material that are upward exposed while the existing structure is lowered layer by layer within the vat are successively photocured,
   wherein in the deposition steps, while the existing structure is lowered layer by layer, light-curing steps are performed successively, wherein in each of the light-curing steps, an image of a shape to be cured on a surface of the light-curable material contained in the vat is divided into several areas according to projection directions and when the several areas are converted and projected with a projector, split images are reflected from a mirror structure and projected in several directions and a combined image becomes the shape to be cured.

10. The 3D over-printing method of claim 9, wherein each of the deposition steps comprises:
    creating a slice image of an area to be over-printed on the existing structure;
    dividing direction in which projection takes place into several directions to determine image areas for the respective directions, and dividing the slice image into images corresponding to respective split areas;
    converting split images and combining the same into one projection image, considering image inversion and image distortion by mirrors;
    loading the combined projection image to the projector for projection; and creating a shape to be cured, by projecting the split images reflected from respective mirror surfaces onto respective split surfaces of an over-printing area.

11. The 3D over-printing method of claim 9, wherein each of the deposition steps comprises:
with the one projector and the mirror structure that comprises two or more mirrors perpendicular or parallel to each other, dividing an image according to directions in which light projected by the projector is reflected from mirror surfaces and projected onto a surface of the light-curable material.

12. The 3D over-printing method of claim 9, wherein each of the deposition steps comprises:
with a plurality of the projectors that are two in number and the mirror structure that comprises two or more mirrors perpendicular or parallel to each other, dividing an image according to directions in which light projected by the projectors is reflected from mirror surfaces and projected onto a surface of the light-curable material.

13. The 3D over-printing method of claim 9, wherein each of the deposition steps comprises:
dividing direction in which projection with the one projector and the mirror structure comprising four mirrors takes place into eight directions.

14. The 3D over-printing method of claim 9, wherein each of the deposition steps comprises:
dividing direction in which projection with a plurality of the projectors that are two in number and the mirror structure comprising four mirrors takes place into 10 directions.

15. The 3D over-printing method of claim 9, wherein each of the deposition steps further comprises:
heating a surface area of the light-curable material so that viscosity of the light-curable material is lowered when a new layer to be cured is created by lowering the existing structure layer by layer.

16. The 3D over-printing method of claim 9, wherein each of the deposition steps further comprises:
driving the existing structure in a mixed manner that raises, lowers, and tilts the existing structure in left and right directions, when a new layer to be cured is created by lowering the existing structure layer by layer.

* * * * *